US012623329B2

(12) United States Patent
Hirabayashi et al.

(10) Patent No.: US 12,623,329 B2
(45) Date of Patent: May 12, 2026

(54) ELECTRIC TOOL

(71) Applicant: MAXELL IZUMI CO., LTD., Matsumoto (JP)

(72) Inventors: Takahito Hirabayashi, Matsumoto (JP); Masafumi Takeshima, Matsumoto (JP)

(73) Assignee: MAXELL IZUMI CO., LTD., Matsumoto (JP)

( * ) Notice: Subject to any disclaimer, the term of this patent is extended or adjusted under 35 U.S.C. 154(b) by 0 days.

(21) Appl. No.: 18/874,088

(22) PCT Filed: Sep. 13, 2022

(86) PCT No.: PCT/JP2022/034200

§ 371 (c)(1),
(2) Date: Dec. 12, 2024

(87) PCT Pub. No.: WO2024/057396

PCT Pub. Date: Mar. 21, 2024

(65) Prior Publication Data

US 2025/0375868 A1 Dec. 11, 2025

(51) Int. Cl.
*B25F 5/00* (2006.01)

(52) U.S. Cl.
CPC .................................... *B25F 5/005* (2013.01)

(58) Field of Classification Search
CPC ........ B25F 5/005; B25F 5/02; H01R 43/0428; F15B 13/0401
See application file for complete search history.

(56) References Cited

U.S. PATENT DOCUMENTS 9,199,389 B2 * 12/2015 Myrhum, Jr. ............ B26D 5/12
10,646,983 B2 * 5/2020 Barezzani ............ B23D 29/002
2005/0120770 A1 * 6/2005 Frenken .................... B25F 5/02 72/453.16
2017/0252912 A1 * 9/2017 Barezzani .............. B23D 15/14
2020/0147772 A1 * 5/2020 Frenken ................ B25B 27/026
2023/0302621 A1 * 9/2023 Kamijo ................... B25F 5/005

FOREIGN PATENT DOCUMENTS

JP 2000-343448 A 12/2000
JP 2000-343452 A 12/2000
JP 2001-009630 A 1/2001
JP 2017-213671 A 12/2017
JP 2020-040157 A 3/2020

OTHER PUBLICATIONS

PCT/ISA/210, "International Search Report for International Application No. PCT/JP2022/034200," Nov. 1, 2022 4pp.

* cited by examiner

*Primary Examiner* — Andrew M Tecco
*Assistant Examiner* — Nicholas E Igbokwe
(74) *Attorney, Agent, or Firm* — HAUPTMAN HAM, LLP

(57) ABSTRACT

An electric tool is capable of automatic return. The electric tool having an oil tank, a hydraulic pump, a motor, a flow channel part, a trigger lever, a first link fitting that connects the trigger lever to an activation switch, a second link fitting that connects the trigger lever to a return switch, and a spring that biases the trigger lever in a returning direction of the trigger lever. The flow channel part includes a pressure increasing flow channel that communicates with the cylinder part, a return flow channel that communicates with the oil tank, a check valve that opens and closes the return flow channel, and a return pin that pushes the check valve to open the return flow channel.

7 Claims, 11 Drawing Sheets

ELECTRIC TOOL

RELATED APPLICATIONS

The present application is National Phase of International Application No. PCT/JP2022/034200 filed Sep. 13, 2022.

TECHNICAL FIELD

The present invention relates to a hydraulic electric tool.

BACKGROUND ART

In the related art, a hydraulic cutting tool having the following configuration has been proposed. In the configuration, a hydraulic oil is supplied by bringing one end side of an activation switch lever (synonymous with a trigger lever) into contact with a power switch (synonymous with an activation switch) and bringing the other end side of the activation switch lever into contact with an operation lever of a return valve (synonymous with a check valve) (PTL 1: JP-A-2001-009630). In addition, a hydraulic crimping tool having the following configuration has been proposed. In the configuration, a slide-type relief button for operating a release valve (synonymous with a check valve) via a lever is disposed in a vicinity of a power switch (synonymous with an activation switch) including a switch handle (synonymous with a trigger lever). While an operation of the switch handle is regulated, a hydraulic oil is supplied and released by operating the switch handle (PTL 2: JP-A-2000-343448 and PTL 3: JP-A-2000-343452). A compression tool or a cutting tool has been proposed as follows. The compression tool or the cutting tool includes a return device including a control substrate that delays opening of a return valve (synonymous with a check valve), a servo motor, a cam, and a lever that engages with a shutter of a return valve (synonymous with a check valve). The compression tool or the cutting tool includes a switch that controls the servo motor such that the lever is set to a position where the return valve is kept open when a drive button (synonymous with an activation switch) is released and the lever is set to a position where the return valve (synonymous with the check valve) is closed when the drive button is driven (PTL 4: JP-A-2017-213671).

CITATION LIST

Patent Literature

PTL 1: JP-A-2001-009630
PTL 2: JP-A-2000-343448
PTL 3: JP-A-2000-343452
PTL 4: JP-A-2017-213671

SUMMARY OF INVENTION

Technical Problem

The electric tools disclosed in PTL 1 to PTL 3 are inevitably limited to a pistol type main body due to a structure in which the trigger lever and the activation switch are close to each other and the trigger lever and the operation lever of the check valve are close to each other, and cannot be applied to a straight type main body. The electric tool disclosed in PTL 4 has a complicated structure in which the servo motor for closing the check valve is exclusively provided. Consequently, electric tool needs a large-scale configuration, requires additional component costs, and is less likely to be reduced in size.

Solution to Problem

The present invention is made in view of the above-described circumstances, and an object of the present invention is to provide an electric tool capable of auto-return and having a small configuration and excellent workability.

The present invention has been accomplished under the solutions as disclosed below.

According to the present invention, there is provided an electric tool including a main body in which a cylinder part is disposed, and a work attachment connected to the main body and operated by a hydraulic pressure of the cylinder part. The main body includes an oil tank, a hydraulic pump for feeding a hydraulic oil inside the oil tank to the cylinder part, a motor for driving the hydraulic pump, a rechargeable battery for supplying electric power to the motor, a flow channel part through which the hydraulic oil passes, a trigger lever, a first link fitting that connects the trigger lever to an activation switch, a second link fitting that connects the trigger lever to a return switch, and a spring that biases the trigger lever in a returning direction of the trigger lever. The flow channel part includes a pressure increasing flow channel that communicates with the cylinder part from the oil tank to feed the hydraulic oil, a return flow channel that communicates with the oil tank from the cylinder part to return the hydraulic oil, a check valve that opens and closes the return flow channel, and a return pin that pushes the check valve to open the return flow channel. The trigger lever is disposed on a side opposite to a side on which the return switch is disposed with respect to an axis passing through the cylinder part.

According to this configuration, the activation switch and the trigger lever are connected by the first link fitting, and the return switch and the trigger lever are connected by the second link fitting. Accordingly, a straight type main body can be achieved while a simple configuration can be adopted. A series of operations from a pressure increasing operation to a return operation can be performed by operating the trigger lever in a combination of the activation switch, the first link fitting, the trigger lever, and the second link fitting. Accordingly, the electric tool capable of auto-return and having a small configuration and excellent workability can be achieved.

It is preferable that the first link fitting includes a first contact part in contact with the activation switch, a rod-shaped part disposed along the axis, and a second contact part in contact with the trigger lever, and that the second link fitting includes a third contact part locked to the return switch, an annular part disposed in a direction intersecting the axis, and a support part supported by the trigger lever. According to this configuration, both the first link fitting and the second link fitting can be easily operated only by operating the trigger lever, and a configuration suitable for the straight type main body can be adopted.

As an example, the main body has a configuration including a controller for controlling the motor, and a select switch for limiting an operating range of the trigger lever. The motor, the activation switch, and the controller are sequentially disposed along the axis. The select switch is disposed close to the trigger lever. According to this configuration, since the select switch is provided, a configuration in which safety is further improved can be adopted. When necessary, work can be easily carried out by switching between an auto-return operation and a holding operation.

As an example, the flow channel part has a configuration including a pressure regulating valve that regulates a pressure on a high-pressure side. The pressure regulating valve is disposed at a position closer to the cylinder part than the check valve. According to this configuration, the pressure regulating valve can be connected to the position close to the cylinder part of the return flow channel while interference with the second link fitting can be avoided. Therefore, a reasonable flow channel configuration can be achieved.

As an example, a configuration has a pressure increasing mode in which the trigger lever is pushed to turn on the activation switch to feed the hydraulic oil to the cylinder part, a holding mode in which the trigger lever is returned to an intermediate position to turn off the activation switch in a state where the check valve is closed to hold the hydraulic oil fed to the cylinder part, and a return mode in which the trigger lever is returned to an initial position to open the check valve to return the hydraulic oil to the oil tank. According to this configuration, the auto-return operation and the holding operation can be switched only by operating the trigger lever.

Advantageous Effects of Invention

According to the present invention, a straight type electric tool capable of auto-return and having a small configuration and excellent workability can be realized by a simple configuration using a first link fitting and a second link fitting.

DESCRIPTION OF EMBODIMENTS

Figure 1:
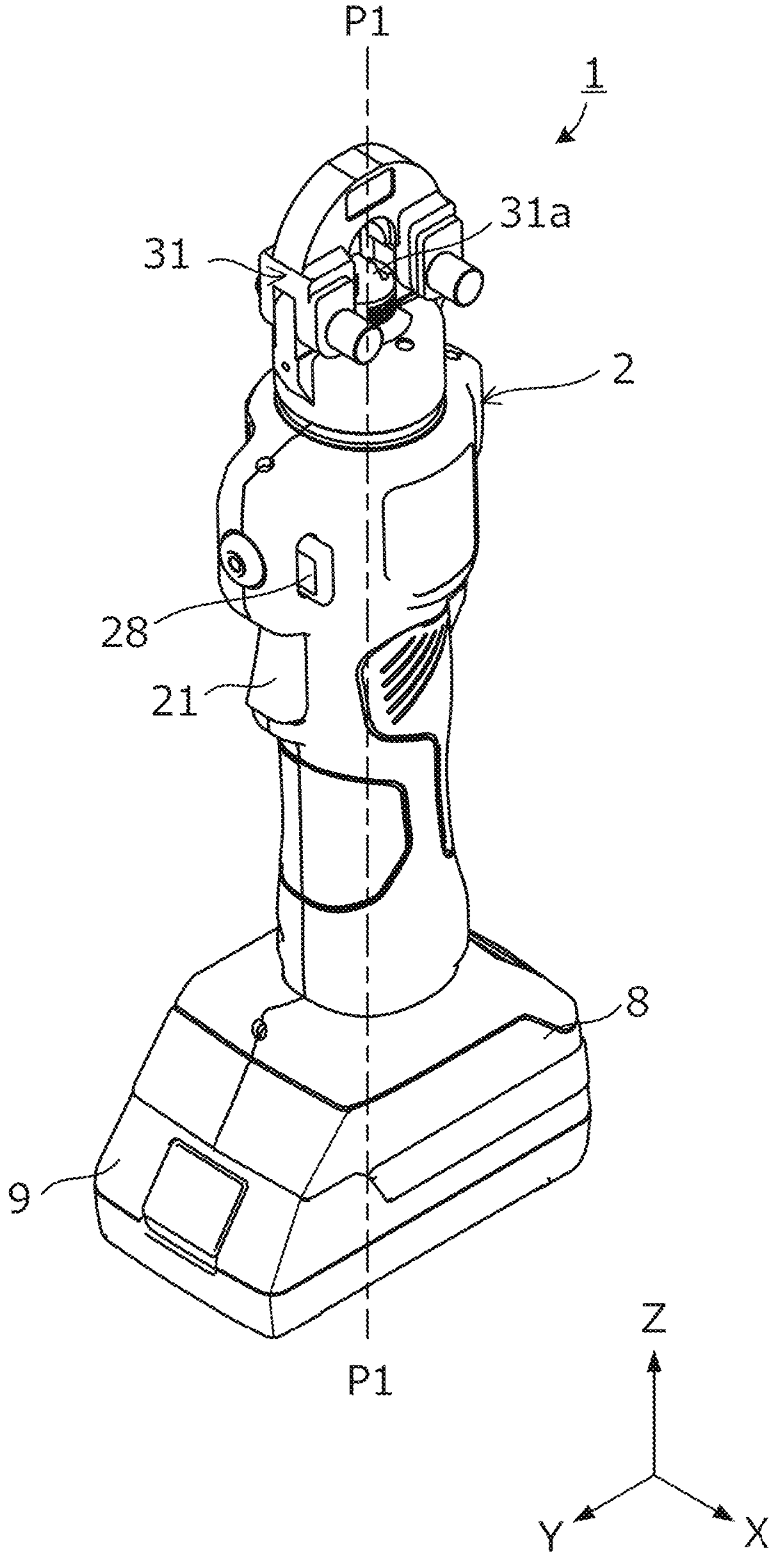
FIG. 1 is a schematic perspective view illustrating an example of an electric tool according to an embodiment of the present invention.

Hereinafter, an embodiment of the present invention will be described in detail with reference to the drawings. The present embodiment is an electric tool 1 including an electric crimping machine, an electric compressor, and an electric cutter. In all drawings for describing the embodiment, the same reference numerals will be assigned to members having the same functions, and repeated description of members to which the same reference numerals are assigned may be omitted, in some cases.

FIGS. 1 to 7 are schematic structure diagrams illustrating an example of the electric tool 1 according to the present embodiment. The electric tool 1 includes a main body 2 in which a cylinder part 3 is disposed, and a work attachment 31 connected to the main body 2 and operated by a hydraulic pressure of the cylinder part 3. In this example, a tool 31*a* in the work attachment 31 is attached to a piston 3*a* of the cylinder part 3. In the present embodiment, there is provided a cordless type tool used by a worker holding the tool with a hand in a jobsite, and the tool is the multifunctional electric tool 1 from which the work attachment 31 is replaced. The work attachment 31 in FIG. 1 is an example used as an electric crimping machine, and the tool 31*a* is a die. Here, to facilitate description of a positional relationship of each part of the electric tool 1, directions are indicated by arrows X, Y, and Z in the drawings. The electric tool 1 is normally operated in any direction.

Figure 2A:
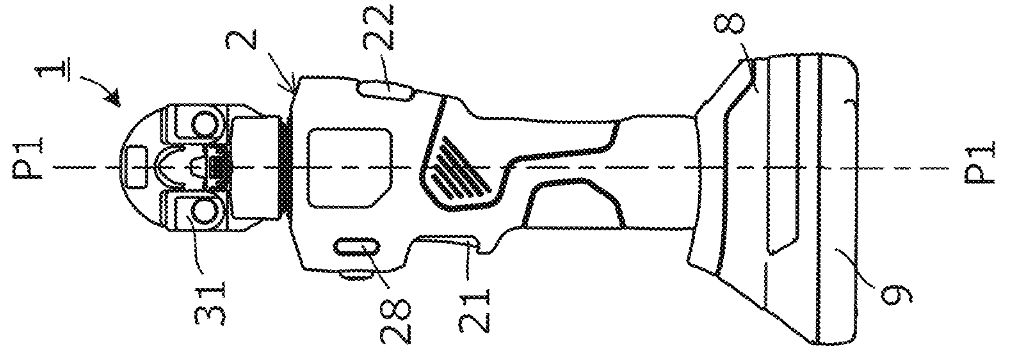
FIG. 2A is a schematic front view of the electric tool illustrated in FIG. 1.
Figure 2B:
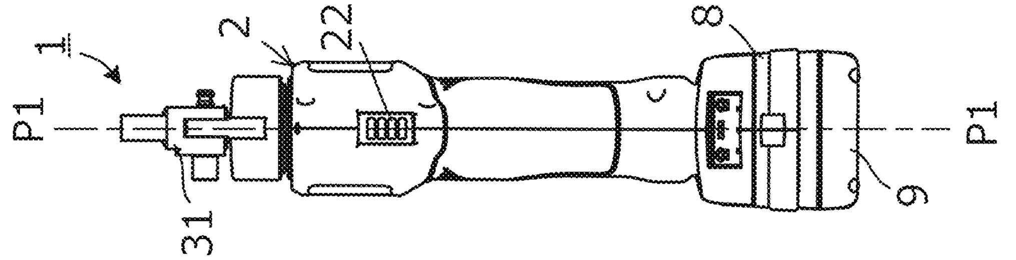
FIG. 2B is a schematic right-side view of the electric tool illustrated in FIG. 1.
Figure 2C:
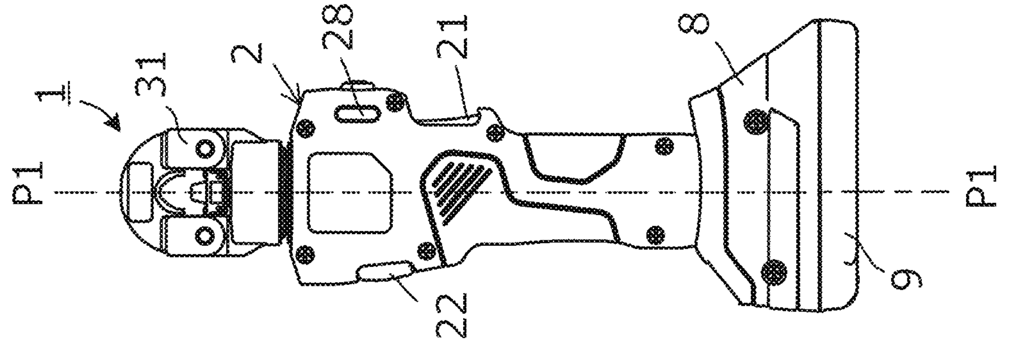
FIG. 2C is a schematic rear view of the electric tool illustrated in FIG. 1.
Figure 2D:
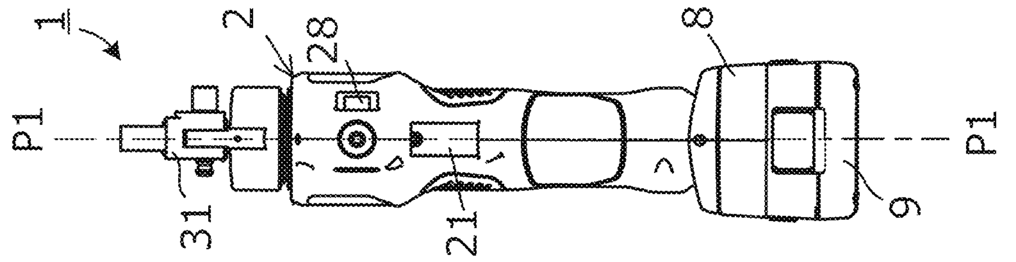
FIG. 2D is a schematic left side view of the electric tool illustrated in FIG. 1.

FIG. 2A is a schematic front view of the electric tool 1, FIG. 2B is a right-side view of FIG. 2A, FIG. 2C is a rear view of FIG. 2A, and FIG. 2D is a left side view of FIG. 2A. The main body 2 includes a trigger lever 21, a return switch 22, and a select switch 28. The trigger lever 21 is disposed on a side opposite to a side on which the return switch 22 is disposed with respect to an axis P1 passing through the main body 2 in a longitudinal direction. The select switch 28 is disposed on a side on which the trigger lever 21 is disposed with respect to the axis P1 passing through the main body 2 in the longitudinal direction. The main body 2 includes an adapter 8 to which a rechargeable battery 9 is connected as a battery pack.

Figure 3A:
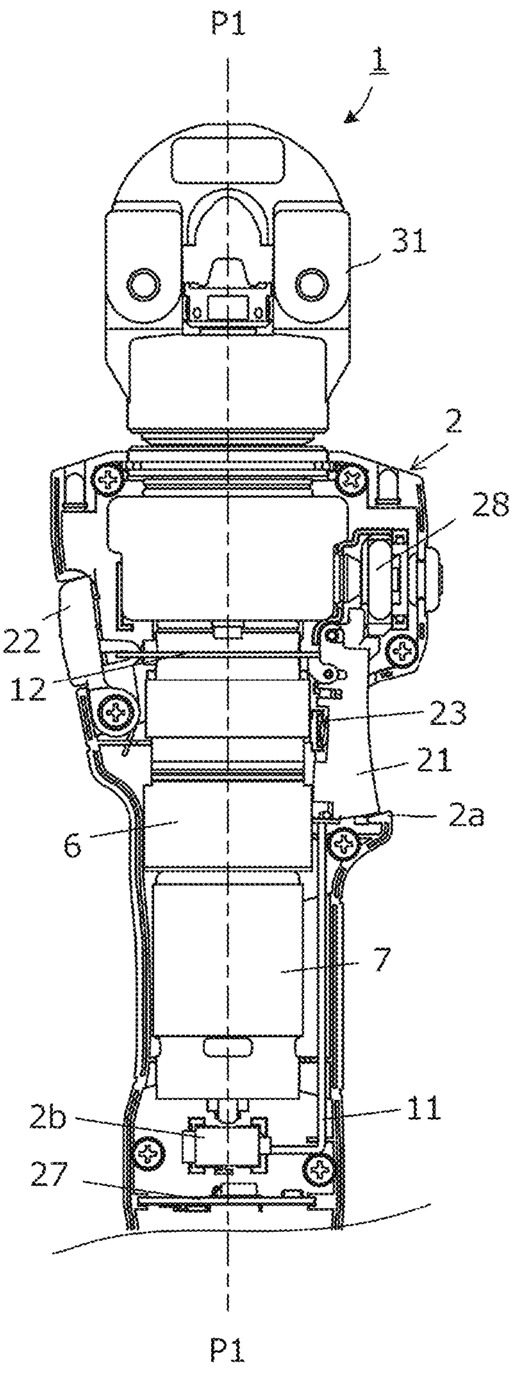
FIG. 3A is a schematic internal structure diagram when a main body is viewed from a rear surface in a case of a pressure increasing mode.
Figure 3B:
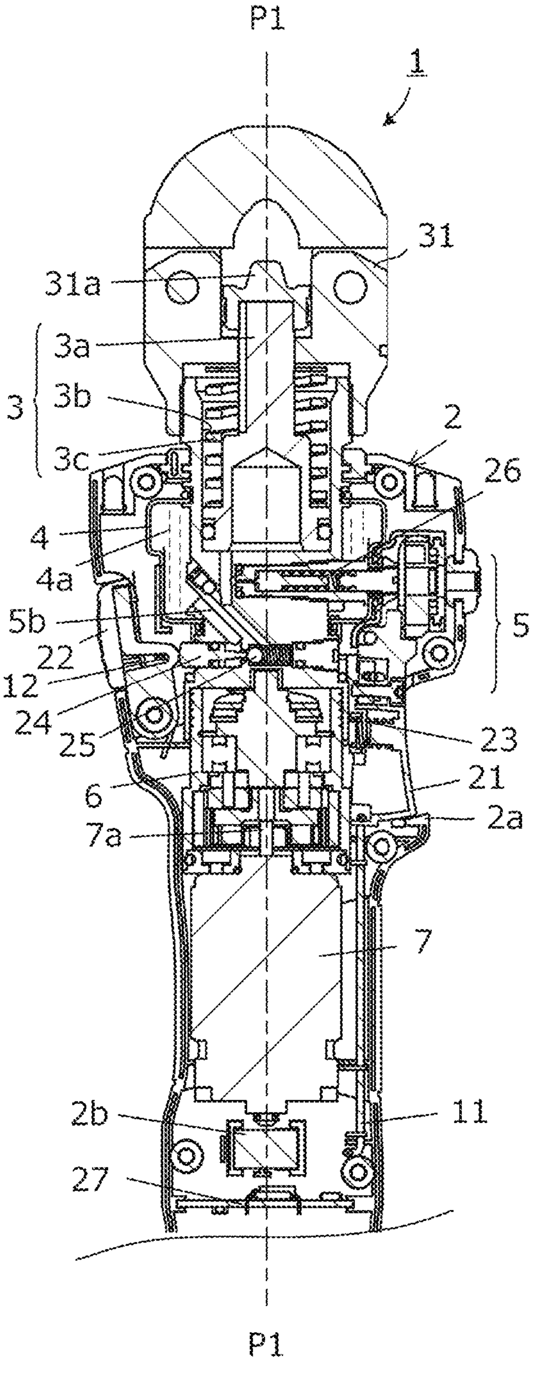
FIG. 3B is a schematic longitudinal sectional view of FIG. 3A.

FIG. 3A is a schematic internal structure diagram when the main body 2 is viewed from a rear surface in a case of a pressure increasing mode, and FIG. 3B is a schematic longitudinal sectional view of FIG. 3A. When the trigger lever 21 is pushed to turn on the activation switch 2*b*, the pressure increasing mode for feeding a hydraulic oil 4*a* to the cylinder part 3 is set. When the main body 2 is in the pressure increasing mode, work for crimping or compressing a compression terminal or a crimping sleeve is carried out as an example.

Figure 4A:
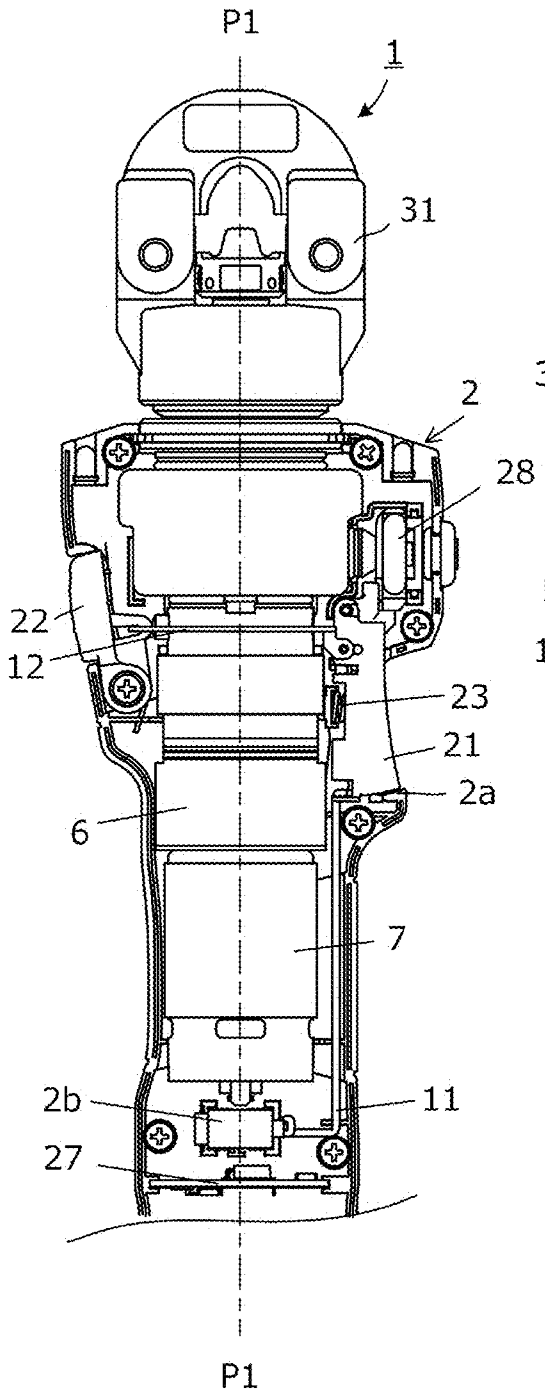
FIG. 4A is a schematic internal structure diagram when the main body is viewed from the rear surface in a case of a holding mode.
Figure 4B:
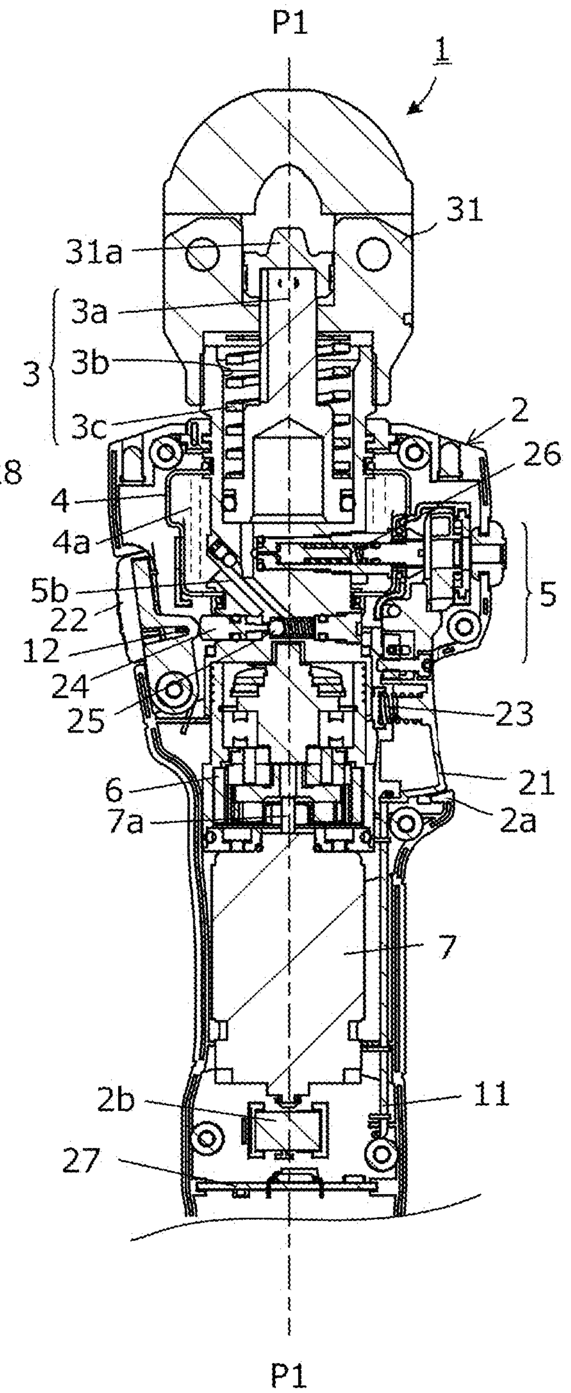
FIG. 4B is a schematic longitudinal sectional view of FIG. 4A.

FIG. 4A is a schematic internal structure diagram when the main body 2 is viewed from the rear surface in a holding mode, and FIG. 4B is a schematic longitudinal sectional view of FIG. 4A. After the compression work or the crimping work is completed, the trigger lever 21 returns to an intermediate position, an activation switch 2*b* is turned off in a state where a check valve 25 is closed, and a holding mode for holding the hydraulic oil 4*a* fed to the cylinder part 3 is set. Since the main body 2 is in the holding mode, for example, the crimping work or the compressing work can be repeatedly carried out in a short time, and since a state where the compression terminal or the crimping sleeve is gripped is held, a position connected to an electric wire can be adjusted by an operator.

Figure 5A:
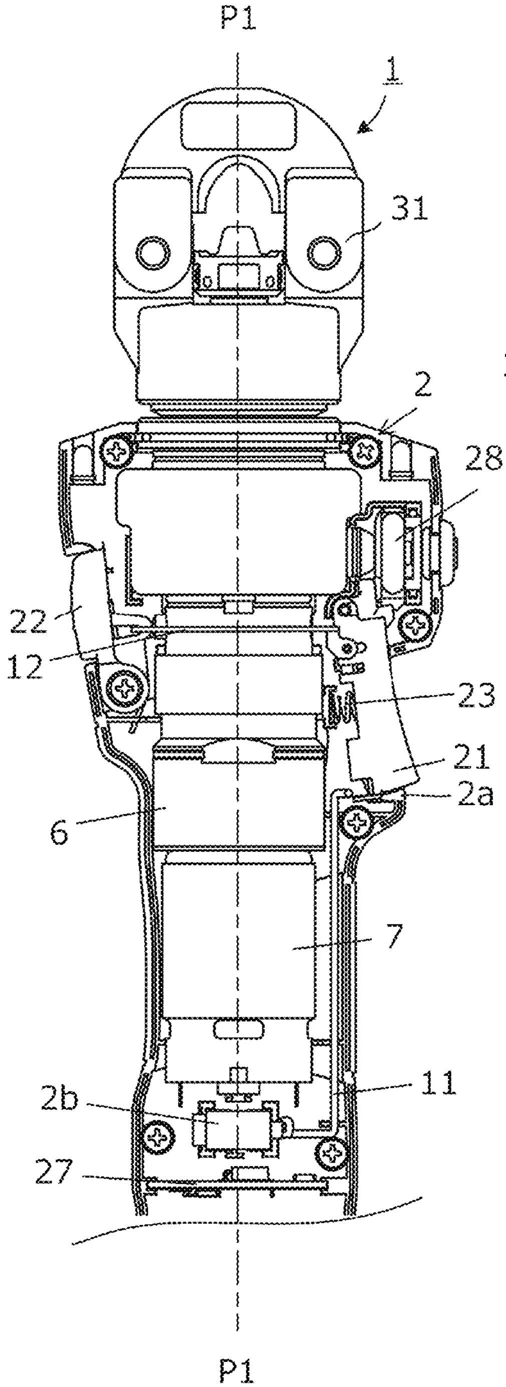
FIG. 5A is a schematic internal structure diagram when the main body is viewed from the rear surface in a case of a return mode.
Figure 5B:
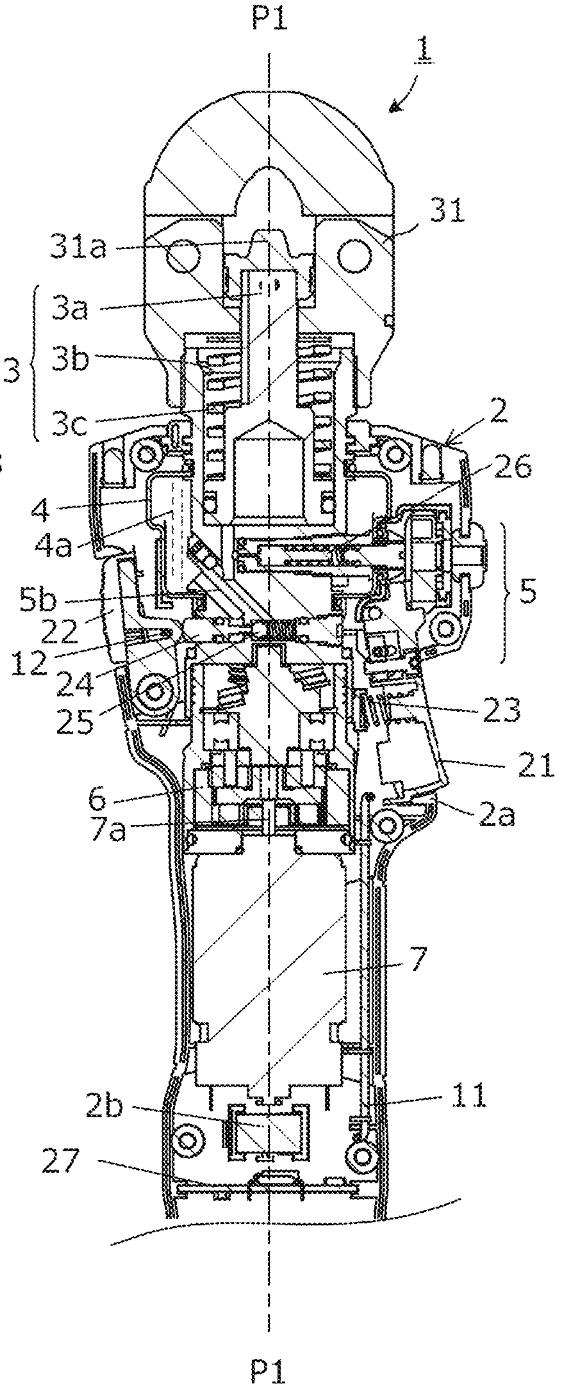
FIG. 5B is a schematic longitudinal sectional view of FIG. 5A.

FIG. 5A is a schematic internal structure diagram when the main body 2 is viewed from the rear surface in a case of a return mode. FIG. 5B is a schematic longitudinal sectional view of FIG. 5A. After a series of works of the compression work or the crimping work are completed, the trigger lever 21 is returned to an initial position, and the check valve 25 is opened to set the return mode for returning the hydraulic oil 4*a* to an oil tank 4. Since the main body 2 is in the return mode, the electric tool 1 is in an initial state. In addition, when necessary, a worker may push the return switch 22 to push a return pin 24, may push the check valve 25 to open a return flow channel 5*b*, and may return the hydraulic oil 4*a* to the oil tank 4, in some cases.

Figure 6:
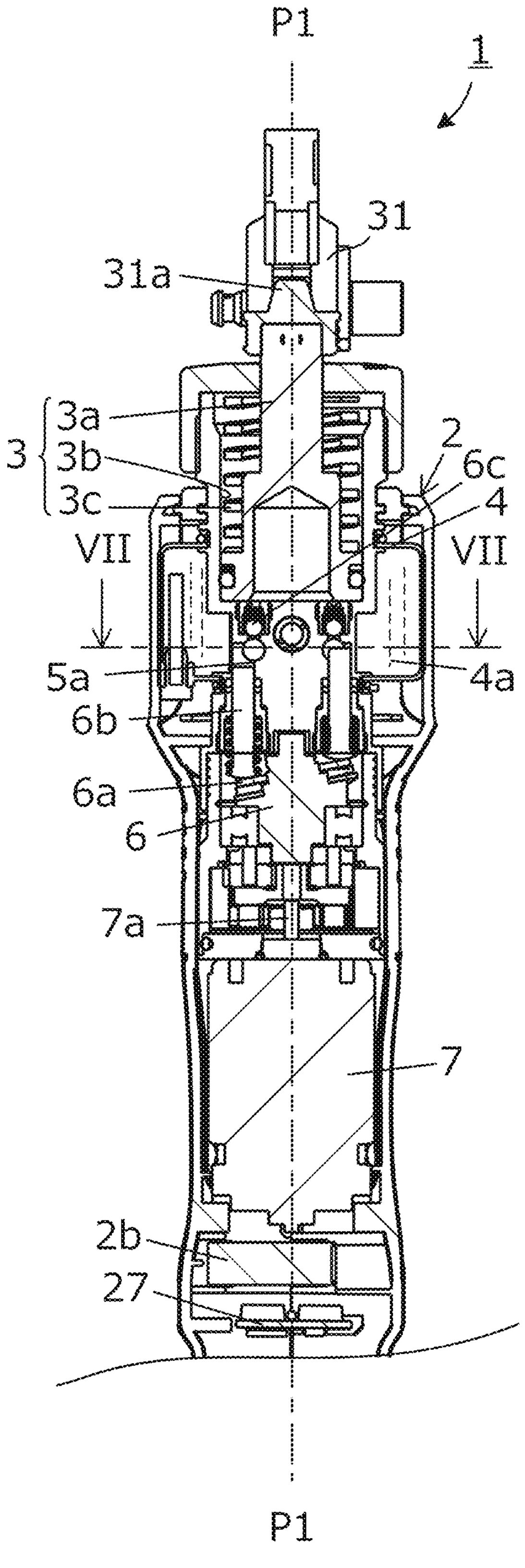
FIG. 6 is a schematic longitudinal sectional view when the main body is viewed from a left side surface.
Figure 7:
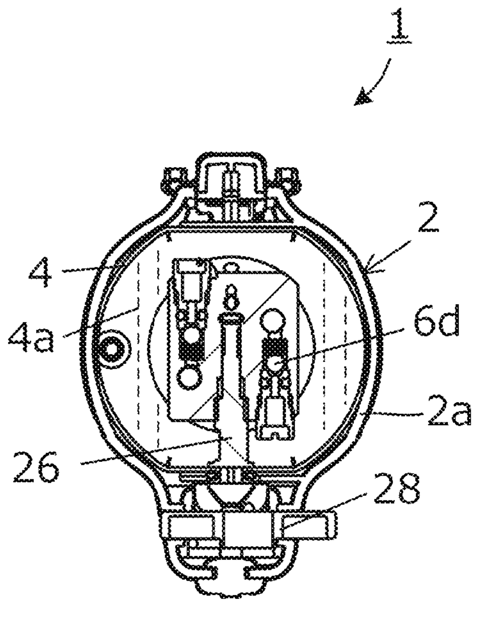
FIG. 7 is a sectional view taken along line VII-VII in FIG. 6 and is a schematic cross-sectional view.

FIG. 6 is a schematic longitudinal sectional view when the main body 2 is viewed from a left side surface. FIG. 7 is a sectional view taken along line VII-VII in FIG. 6, and is a schematic cross-sectional view. The electric tool 1 includes an inclined plate cam 6*a* rotated by being connected to a drive shaft 7*a* of a motor 7, and a plurality of plungers 6*b* disposed around an axis P1 passing through the drive shaft 7*a* in the cylinder part 3 and reciprocating while being in contact with the inclined plate cam 6*a*. The oil tank 4 is disposed at a position connecting the cylinder part 3 and a hydraulic pump 6. The oil tank 4 communicates with the hydraulic pump 6 via a suction check valve 6*d*. In addition, the oil tank 4 communicates with the cylinder part 3 via a discharge check valve 6*c*.

The main body 2 includes the oil tank 4, the hydraulic pump 6 that feeds the hydraulic oil 4*a* inside the oil tank 4 to the cylinder part 3, the motor 7 that drives the hydraulic pump 6, the rechargeable battery 9 that supplies electric power to the motor 7, a flow channel part 5 through which the hydraulic oil 4*a* passes, and the trigger lever 21 that operates the work attachment 31. In addition, a first link fitting 11 that connects the trigger lever 21 and the activation switch 2*b*, a second link fitting 12 that connects the trigger lever 21 and the return switch 22, and a coil-shaped spring 23 that biases the trigger lever 21 in a return direction of the trigger lever 21 are disposed in a housing 2*a* of the main body 2.

In the cylinder part 3, the piston 3*a* is disposed in a piston chamber 3*b*, and a coil spring 3*c* is disposed along an outer periphery of the piston 3*a* in alignment with an axis of the piston 3*a*. The hydraulic pump 6 feeds the hydraulic oil 4*a* stored in the oil tank 4 to the cylinder part 3. In addition, the main body 2 includes the motor 7 connected to the hydraulic pump 6 to drive the hydraulic pump 6, and a controller 27 that controls the drive of the motor 7.

The flow channel part 5 has a pressure increasing flow channel 5*a* communicating with the cylinder part 3 from the oil tank 4 and feeding the hydraulic oil 4*a*, and the return flow channel 5*b* communicating with the oil tank 4 from the cylinder part 3 and returning the hydraulic oil 4*a*. In the return flow channel 5*b*, the check valve 25 is disposed on the path, and the return pin 24 that pushes the check valve 25 to open the return flow channel 5*b* is disposed. In addition, in the flow channel part 5, a pressure regulating valve 26 that regulates a pressure on a high-pressure side is connected to the path of the return flow channel 5*b*, and the pressure regulating valve 26 is disposed at a position closer to the cylinder part 3 than the check valve 25.

The adapter 8 is disposed in the main body 2, and the rechargeable battery 9 that supplies electric power to the motor 7 and the controller 27 is detachably connected to the adapter 8 as a battery pack. As an example, the rechargeable battery 9 is a lithium-ion battery, a nickel hydrogen battery, or another known rechargeable battery. According to this configuration, the electric tool 1 is excellent in portability. For example, the hydraulic pump 6, the motor 7, the activation switch 2*b*, the adapter 8, and the rechargeable battery 9 are sequentially disposed along the axis P1. The activation switch 2*b* for energizing the motor 7 is disposed at a position between the motor 7 and the controller 27. According to this configuration, a reasonable configuration in which electric system component dispositions and hydraulic system component dispositions are partitioned can be achieved.

Figure 8A:
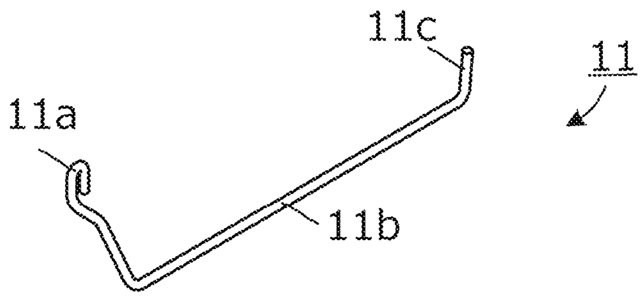
FIG. 8A is a schematic perspective view of a first link fitting according to the present embodiment.
Figure 8B:
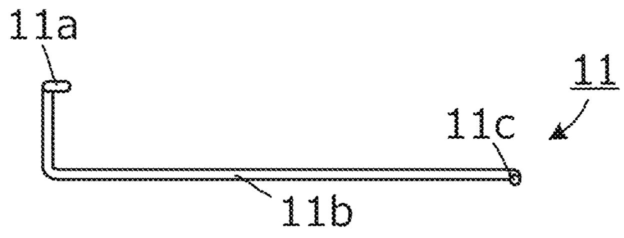
FIG. 8B is a schematic front view of FIG. 8A.
Figure 8C:
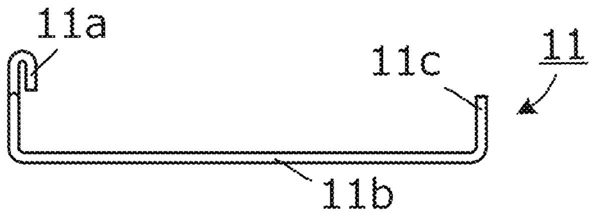
FIG. 8C is a schematic plan view of FIG. 8A.
Figure 8D:
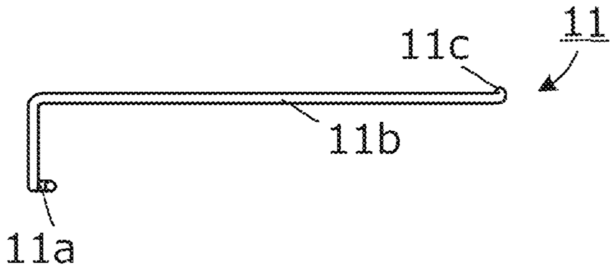
FIG. 8D is a schematic bottom view of FIG. 8A.

FIG. 8A is a schematic perspective view of the first link fitting 11, FIG. 8B is a schematic front view of FIG. 8A, FIG. 8C is a schematic plan view of FIG. 8A, and FIG. 8D is a schematic bottom view of FIG. 8A. The first link fitting 11 includes a first contact part 11*a* in contact with the activation switch 2*b*, a rod-shaped part 11*b* disposed along the axis P1, and a second contact part 11*c* in contact with the trigger lever 21. As an example, the first link fitting 11 is formed by bending a hard metal shaft.

Figure 9A:
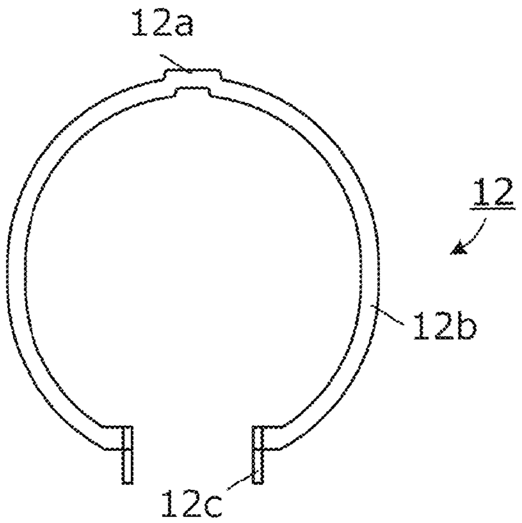
FIG. 9A is a schematic front view of a second link fitting according to the present embodiment.
Figure 9B:
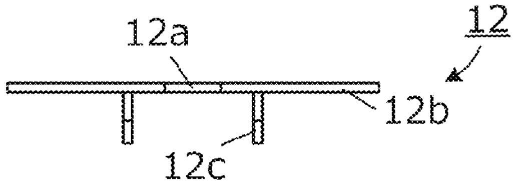
FIG. 9B is a schematic plan view of FIG. 9A.
Figure 9C:
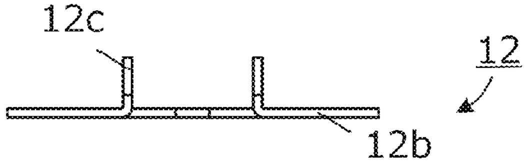
FIG. 9C is a schematic bottom view of FIG. 9A.
Figure 9D:
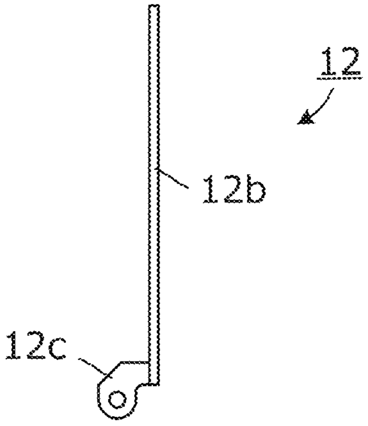
FIG. 9D is a schematic side view of FIG. 9A.

FIG. 9A is a schematic front view of the second link fitting 12, FIG. 9B is a schematic plan view of FIG. 9A, FIG. 9C is a schematic bottom view of FIG. 9A, and FIG. 9D is a schematic side view of FIG. 9A. The second link fitting 12 includes a third contact part 12*a* locked to the return switch 22, an annular part 12*b* disposed in a direction intersecting the axis P1, and a support part 12*c* supported by the trigger lever 21. As an example, the second link fitting 12 is formed by performing press working on a hard metal plate.

Figure 10A:
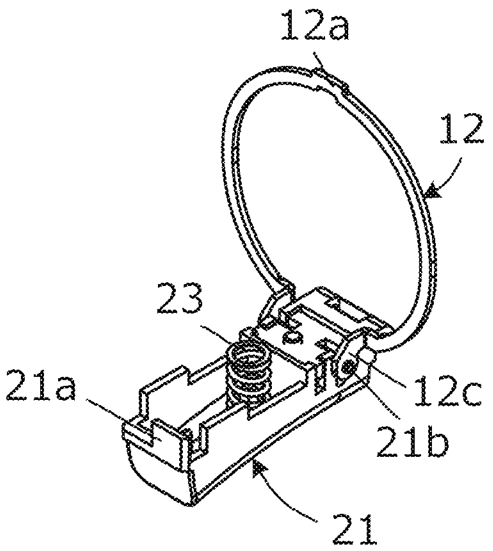
FIG. 10A is a schematic perspective view illustrating a state where the second link fitting according to the present embodiment is assembled to a trigger lever.
Figure 10B:
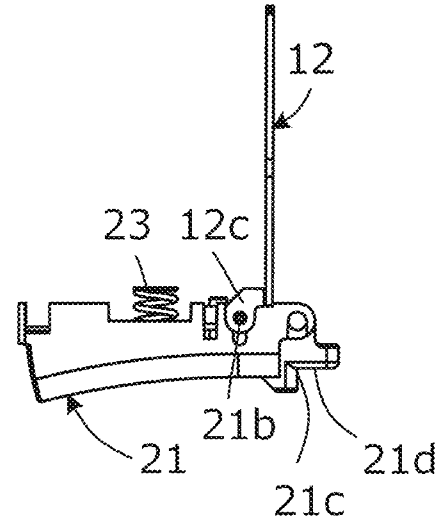
FIG. 10B is a schematic side view of FIG. 10A.

FIG. 10A is a schematic perspective view illustrating a state where the second link fitting 12 is assembled to the trigger lever 21, and FIG. 10B is a schematic side view of FIG. 10A. A fourth contact part 21*a* in contact with the second contact part 11*c* of the first link fitting 11 is formed on one end side of the trigger lever 21 in the longitudinal direction. The spring 23 is disposed in the vicinity of the center in the longitudinal direction of the trigger lever 21, and a receiving part 21*b* having a protruding shape is provided on a side opposite to the fourth contact part 21*a* with respect to the spring 23. A through-hole of the support part 12*c* of the second link fitting 12 is fitted to the receiving part 21*b* of the trigger lever 21 to be pivotable.

Figure 11A:
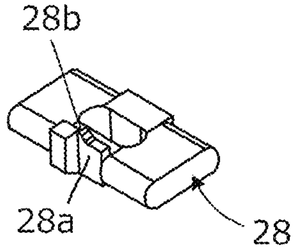
FIG. 11A is a schematic perspective view of a select switch according to the present embodiment.
Figure 11B:
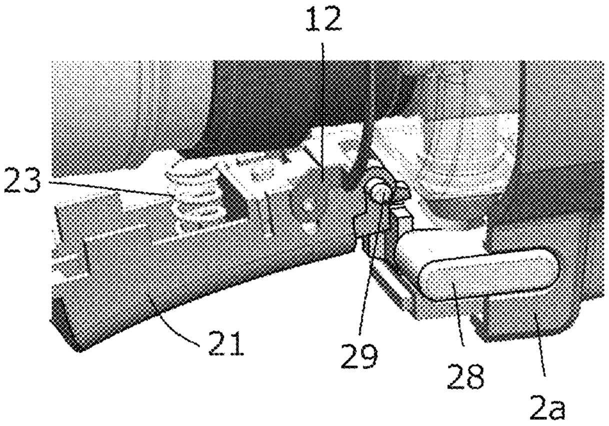
FIG. 11B is a schematic structure diagram illustrating a disposition relationship between the select switch and the trigger lever in the return mode according to the present embodiment.
Figure 11C:
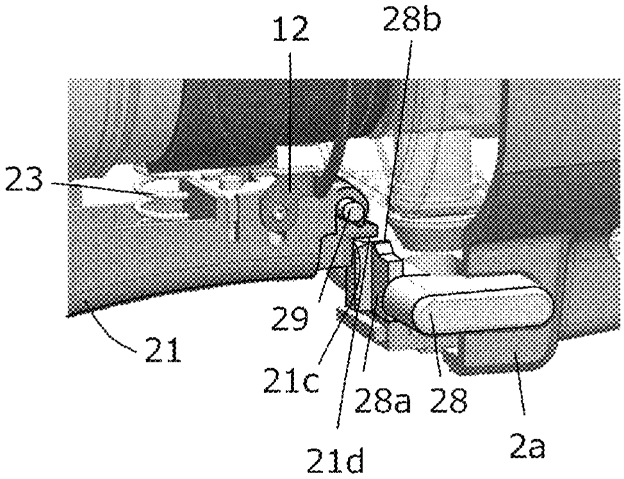
FIG. 11C is a schematic structure diagram illustrating a disposition relationship between the select switch and the trigger lever in the holding mode according to the present embodiment.

FIG. 11A is a schematic perspective view of the select switch 28. FIG. 11B is a schematic structure diagram illustrating a disposition relationship between the select switch 28 and the trigger lever 21 in the return mode. FIG. 11C is a schematic structure diagram illustrating a disposition relationship between the select switch 28 and the trigger lever 21 in the holding mode. The trigger lever 21 is pivotally supported by a support pin 29 attached to the housing 2*a* of the main body 2. The select switch 28 is a plate-shaped body having an elliptical cross section, and is attached to the housing 2*a* in the direction intersecting the axis P1. In the select switch 28, a second restriction surface 28*a* that comes into contact with a first restriction surface 21*c* of the trigger lever 21 is formed on one end side in a short direction. In addition, in the select switch 28, a fourth restriction surface 28*b* that comes into contact with a third restriction surface 21*d* of the trigger lever 21 is formed above one end side in the short direction.

The select switch 28 is disposed close to the trigger lever 21, and limits an operation range of the trigger lever 21. As illustrated in FIG. 11B, when the select switch 28 is pushed, the trigger lever 21 is brought into a non-contact state with the select switch 28, and the operation range of the trigger lever 21 is not limited. Therefore, auto-return is available. As illustrated in FIG. 11C, when the select switch 28 is pulled out, the trigger lever 21 is returned to the intermediate position, and the trigger lever 21 is brought into a contact state with the select switch 28 in the holding mode. In this state, the operation range of the trigger lever 21 is limited. Therefore, the holding mode is maintained. Here, when the select switch 28 is pushed to an intermediate position, the select switch 28 can limit the operation range of the trigger lever 21 so that the trigger lever 21 does not move from the initial position. Since the select switch 28 is provided, a configuration having further improved work safety can be achieved. When necessary, work can be easily carried out by switching between an auto-return operation and a holding operation.

In the above-described example, the push-type select switch 28 has been described, but the configuration is not limited to this example. For example, a slide-type select switch or a dial-type select switch can be provided instead of the push-type select switch. In the above-described example, the configuration in which the second link fitting 12 has the annular part 12*b* has been described, but the configuration is not limited to this example. For example, the second link fitting having a bow-shaped part or an arc-shaped part can be provided instead of the annular part 12*b*.

In the above-described example, the electric tool 1 having the straight type main body has been described, but the configuration is not limited to this example. The present configuration can be applied to a portable electric tool. The present invention is not limited to the embodiment described above, and various modifications can be made within the scope not departing from the present invention.

What is claimed is:

1. An electric tool comprising:

a main body in which a cylinder part is disposed; and a work attachment connected to the main body and operated by a hydraulic pressure of the cylinder part, wherein the main body includes an oil tank, a hydraulic pump for feeding a hydraulic oil inside the oil tank to the cylinder part, a motor for driving the hydraulic pump, a rechargeable battery for supplying electric power to the motor, a flow channel part through which the hydraulic oil passes, a trigger lever, a first link fitting that connects the trigger lever to an activation switch, a second link fitting that connects the trigger lever to a return switch, and a spring that biases the trigger lever in a returning direction of the trigger lever, the flow channel part includes a pressure increasing flow channel that communicates with the cylinder part from the oil tank to feed the hydraulic oil, a return flow channel that communicates with the oil tank from the cylinder part to return the hydraulic oil, a check valve that opens and closes the return flow channel, and a return pin that pushes the check valve to open the return flow channel, the trigger lever is disposed on a side opposite to a side on which the return switch is disposed with respect to an axis passing through the cylinder part, the first link fitting includes a first contact part in contact with the activation switch, a rod-shaped part disposed along the axis, and a second contact part in contact with the trigger lever, the second link fitting includes a third contact part locked to the return switch, an annular part disposed in a direction intersecting the axis, and a support part supported by the trigger lever, and the trigger lever is configured for performing a series of operations from a pressure increasing operation to a return operation.

2. The electric tool according to claim 1, wherein the first link fitting includes a first contact part in contact with the activation switch, a rod-shaped part disposed along the axis, and a second contact part in contact with the trigger lever, and the second link fitting includes a third contact part locked to the return switch, an annular part disposed in a direction intersecting the axis, and a support part supported by the trigger lever.

3. The electric tool according to claim 1, wherein the main body includes a controller for controlling the motor, and a select switch for limiting an operating range of the trigger lever, the motor, the activation switch, and the controller are sequentially disposed along the axis, and the select switch is disposed close to the trigger lever.

4. The electric tool according to claim 1, wherein the flow channel part includes a pressure regulating valve that regulates a pressure on a high-pressure side, and the pressure regulating valve is disposed at a position closer to the cylinder part than the check valve.

5. The electric tool according to claim 1, wherein the flow channel part includes a pressure regulating valve that regulates a pressure on a high-pressure side, and the pressure regulating valve is disposed at a position closer to the cylinder part than the check valve.

6. The electric tool according to claim 1, wherein the electric tool has a pressure increasing mode in which the trigger lever is pushed to turn on the activation switch to feed the hydraulic oil to the cylinder part, a holding mode in which the trigger lever is returned to an intermediate position to turn off the activation switch in a state where the check valve is closed to hold the hydraulic oil fed to the cylinder part, and a return mode in which the trigger lever is returned to an initial position to open the check valve to return the hydraulic oil to the oil tank.

7. The electric tool according to claim 1, wherein the electric tool has a pressure increasing mode in which the trigger lever is pushed to turn on the activation switch to feed the hydraulic oil to the cylinder part, a holding mode in which the trigger lever is returned to an intermediate position to turn off the activation switch in a state where the check valve is closed to hold the hydraulic oil fed to the cylinder part, and a return mode in which the trigger lever is returned to an initial position to open the check valve to return the hydraulic oil to the oil tank.

* * * * *